United States Patent [19]

Furuyama

[11] Patent Number: 5,600,370
[45] Date of Patent: Feb. 4, 1997

[54] IMAGE SENSING APPARATUS WITH FADING ACTION AND CONTROL THEREOF

[75] Inventor: Hiroaki Furuyama, Tokyo, Japan

[73] Assignee: Canon Kabushiki Kaisha, Tokyo, Japan

[21] Appl. No.: 327,222

[22] Filed: Oct. 21, 1994

Related U.S. Application Data

[63] Continuation of Ser. No. 876,853, Apr. 30, 1992, abandoned.

[30] Foreign Application Priority Data

May 10, 1991 [JP] Japan ................................ 3-104555

[51] Int. Cl.$^6$ ...................................................... H04N 5/262
[52] U.S. Cl. ............................................. 348/239; 348/595
[58] Field of Search .................................. 348/239, 207, 348/591, 592, 593, 594, 595, 223, 225, 228, 234, 238; H04N 5/225

[56] References Cited

U.S. PATENT DOCUMENTS

| 4,340,903 | 7/1982 | Tamura | 348/595 |
| 4,591,913 | 5/1986 | Pohl | 358/183 |
| 5,003,404 | 3/1991 | Yoshimura et al. | 358/335 |
| 5,168,363 | 12/1992 | Kojima et al. | 358/183 |
| 5,287,187 | 2/1994 | Sato et al. | 348/239 |

FOREIGN PATENT DOCUMENTS

| 63-294079 | 11/1988 | Japan | H04N 5/262 |
| 2-72772 | 3/1990 | Japan | H04N 5/262 |
| 2-228887 | 9/1990 | Japan | H04N 5/262 |

Primary Examiner—Wendy Garber
Assistant Examiner—Tuan V. Ho
Attorney, Agent, or Firm—Robin, Blecker, Daley & Driscoll

[57] ABSTRACT

A video camera includes a first designating member arranged to designate a fade mode, a second designating member arranged to designate timing of fade-in/fade-out, a processing circuit arranged to perform a fade process, and a control circuit arranged to cause the processing circuit to start the fade process when designating actions are performed simultaneously by the first and second designating members.

47 Claims, 6 Drawing Sheets

IMAGE SENSING APPARATUS WITH FADING ACTION AND CONTROL THEREOF

This is a continuation application under 37 CFR 1.62 of prior application Ser. No. 07/876,853 filed Apr. 30, 1992 (abandoned).

BACKGROUND OF THE INVENTION:

1. Field of the Invention:

This invention relates to a video camera of the kind having a fade function.

Figure 1A:
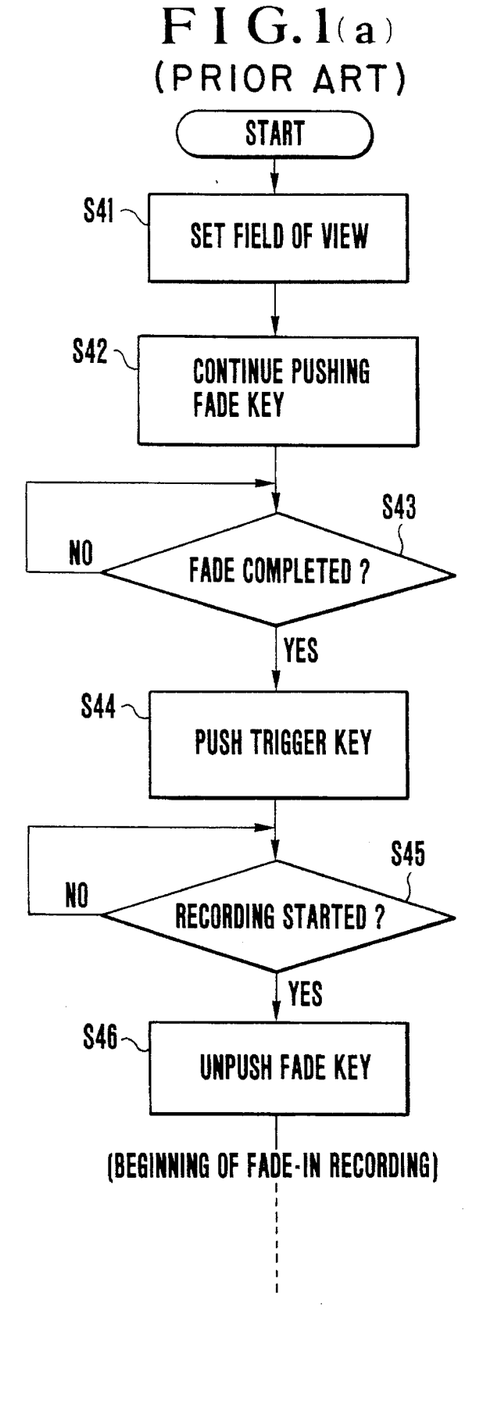
FIGS. 1(a) and 1(b) are flow charts showing by way of example the conventional fade-in and fade-out recording operations.

2. Description of the Related Art:

Video cameras include camera-integrated type VTRs (video tape recorders). The camera-integrated type VTRs of the above-stated kind have been arranged, for example, to have fade-in and fade-out recording operations performed in the following manners:

(1) FIG. 1(a) of the accompanying drawings is a flow chart showing the fade-in recording operation. Referring to FIG. 1(a), a field of view to be recorded is set at a step S41. At a step S42, a fade key continues being pushed. Preparations are made for the fade-in recording. Step S43: The flow of operation waits until the whole picture changes to a fade color. Step S44: A trigger key (start/stop key) is pushed. Step S45: A check is made through an electronic viewfinder (EVF) or the like for the start of recording. Step S46: Upon confirmation of the start of recording, the fade key is released from the state of being continuously pushed. The fade-in recording is caused to begin in this manner.

Figure 1B:
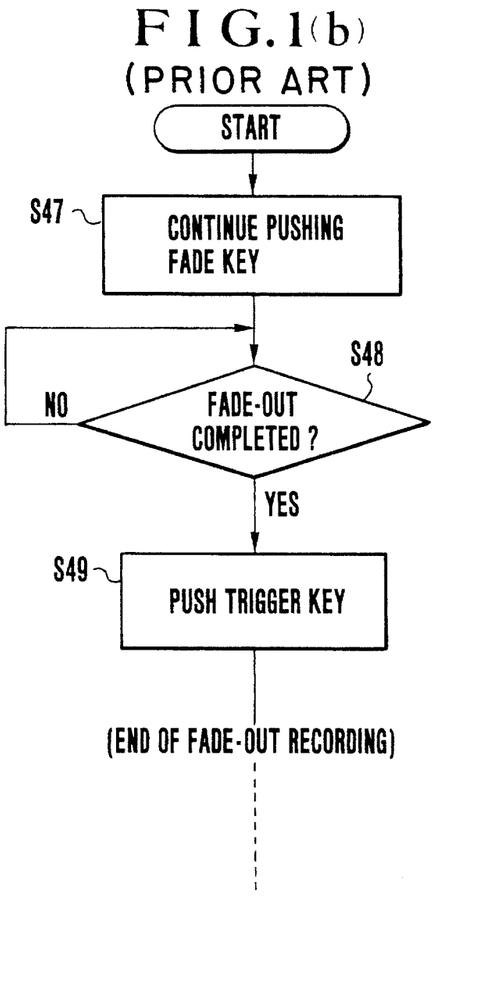

(2) The fade-out recording operation is performed as shown in FIG. 1(b) which is a flow chart. Referring to FIG. 1(b), the fade key begins to continue being pushed at a step S47 when it is desired to terminate a recording operation. Step S48: The flow of operation waits for the end of a fade-out process (until the whole picture changes to a fade color). Step S49: Upon confirmation of the end of the fade-out process, the trigger key is pushed. The fade-out recording comes to an end.

Figure 2A:
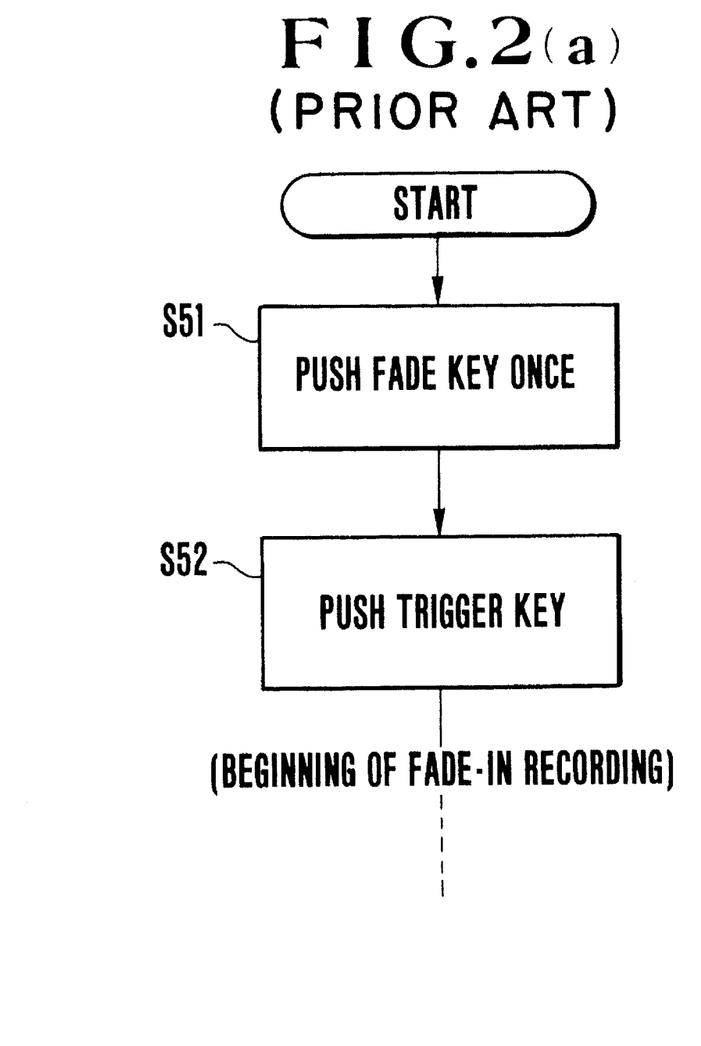
FIGS. 2(a) and 2(b) are flow charts showing another example of the conventional fade-in and fade-out recording operations.
Figure 2B:
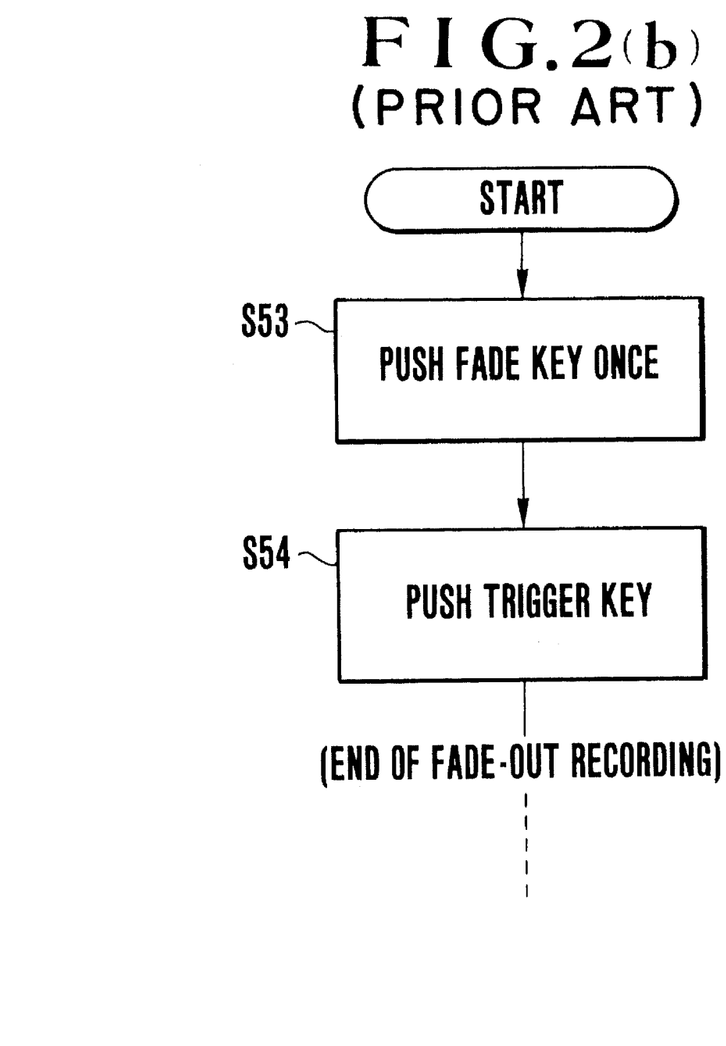

(3) FIGS. 2(a) and 2(b) are flow charts showing another method for performing fade-in and fade-out recording operations. Referring to FIGS. 2(a) and 2(b), at a step S51 or S53, a fade key is pushed once prior to the start or end of a recording operation. Step S52 or S54: When a trigger key is pushed under this condition, the trigger key operation is recognized as a fade trigger key operation. Fade-in recording is automatically performed (recording begins after instantaneously changing the whole picture to a fade color by a quick fade), or fade-out recording is automatically performed (recording ends when the whole picture has changed to a fade color and the recording comes to make a pause).

The conventional operation examples (1), (2) and (3), however, have presented the following problems:

In the case of the operation example (1), a long period of time is required for changing the color of the whole picture to the fade color after pushing the fade key. (The same length of time is required also for the fade-out.) During the long period of time, therefore, the field of view might come to deviate while it is impossible to confirm the image desired immediately before the start of recording. Further, with the trigger key pushed, the fade key is released from the state of being pushed after the lapse of time required for the actual start of recording. However, since some length of time is required after the trigger key is pushed and before the actual start of recording, although the length of time is short, the timing of the start of recording tends to variously differ from the timing of the fade process in every case.

In the operation example (2), with the fade key continuing being pushed, the fade-out recording is terminated by pushing the trigger key upon completion of the fade process. The pushing operation on the fade key is troublesome as the fade key must continue being pushed until the end of the fade process. Besides, the state of the fade process and the timing of terminating the recording somewhat fluctuate in every case. It is, therefore, impossible to make the fade-out time constant.

In the event of the operation example (3), the function (normal-trigger or fade-trigger) of the trigger key must be selected and set beforehand. Therefore, in cases where recording must be quickly started or stopped, the operation tends to become too late.

SUMMARY OF THE INVENTION:

This invention is directed to the solution of the above-stated problems of the prior art. Therefore, it is a general object of this invention to provide a video camera which is arranged to permit easy operations and easy timing adjustment for the fade process.

To attain this object, a video camera arranged as an embodiment of this invention comprises: first designating means for designating a fade mode; second designating means for designating timing of fade-in/fade-out; processing means for performing a fade process; and control means for causing the processing means to start the fade process when the first designating means and the second designating means have simultaneously designated the fade mode and the timing of fade-in/fade-out, respectively.

With the embodiment arranged as described above, the fade process begins when the first and second designating means have simultaneously made designation.

The above and other objects and features of the invention will become apparent from the following detailed description of an embodiment thereof taken in connection with the accompanying drawings.

Figure 3:
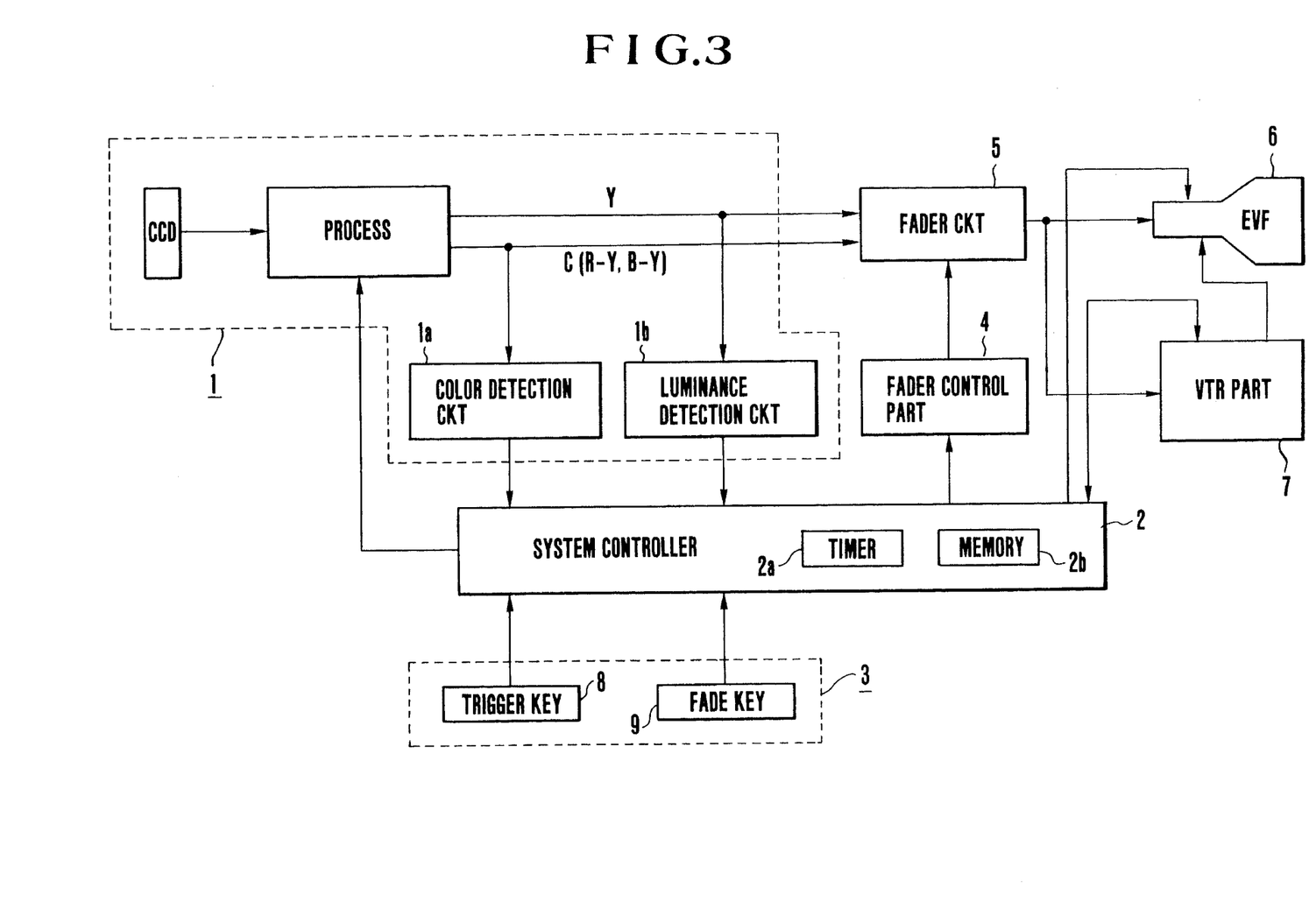
FIG. 3 is a block diagram showing the essential parts of an embodiment of this invention.

DETAILED DESCRIPTION OF THE PREFERRED EMBODIMENT:

The following describes the details of this invention through an embodiment thereof:

FIG. 3 shows in a block diagram the essential parts of a camera-integrated type VTR arranged according to this invention as an embodiment thereof, including parts related to a fade function of the VTR.

Referring to FIG. 3, a camera part 1 includes the lens of an optical system, a solid-state image sensor (such as a CCD), an automatic focusing mechanism, an automatic white-balance adjustment mechanism, etc. The camera part 1 is arranged to adjust focus, the quantity of light, etc., with respect to a field of view in accordance with instructions received from a system controller 2, to convert into a video signal an optical image of the field of view formed through the lens, and to send out the video signal to a fader circuit 5. The camera part 1 further includes a color detection circuit 1a and a luminance detection circuit 1b. The color detection circuit 1a is arranged to detect the dominant color of a photographed object (the hue and saturation of the dominant color of the object) on the basis of color component signals (such as color-difference signals R-Y and B-Y) included in the above-stated video signal. The detection output of the color detection circuit 1a is supplied to the system controller 2. The luminance detection circuit 1b is arranged to detect the brightness of the object on the basis of a luminance signal which is also included in the above-stated video signal. The detection output of the luminance detection circuit 1b is supplied to the system controller 2.

An operation part 3 is disposed on an external part of the body of the camera-integrated type VTR. The operation part 3 consists of various operation switches including a fade switch; a trigger switch; an automatic-focusing designating switch; a white-balance designating switch; a date setting switch; a power switch; an ejector switch; and other switches related to the VTR part of the embodiment. When each of these switches is turned on, information is given to the system controller 2.

The system controller 2 has a microcomputer (CPU). Upon receipt of signals from the camera part 1, the operation part 3, the VTR part 7, etc., the system controller 2 discerns the meanings of these signals and sends out control signals of varied kinds as necessary. The system controller 2 contains a timer 2a which is arranged to count a time interval between the on-and off-operations of the above-stated trigger switch (a recording time). The system controller 2 causes the result of time count to be supplied to and displayed at an EVF (electronic viewfinder) 6.

A fader control part 4 is arranged to control the fader circuit 5 by performing a time adjustment action on fade-in, fade-out and quick-fade processes, etc., and a color setting action in accordance with instructions from the system controller 2. The fader circuit 5 is arranged to perform a fade process on the video signal coming from the camera part 1 and to send out the video signal thus processed to the EVF 6 and the VTR part 7.

The VTR part 7 is arranged to record the video signal coming from the fader circuit 5 on a magnetic tape in accordance with a recording instruction received from the system controller 2, to reproduce the recorded video signal in accordance with a reproducing instruction from the system controller 2, and to send out the reproduced video signal to the EVF 1 electronic viewfinder) 6.

The EVF 6 is composed of a small Braun tube and is arranged to receive the video signal from the fader circuit 5 or from the VTR part 7 and also the recording time from the system controller 2, and to display an image and the recording time accordingly.

A trigger key 8 is contained in the operation part 3 to instruct the system controller 2 to start and stop recording by moving the trigger switch. The trigger key 8 is arranged at a grip part in a position to facilitate a shooting operation to be performed by the operator. A fade key 9 is contained also in the operation part 3 to instruct the system controller 2 to select a fade function by moving the fade switch.

Figure 4:
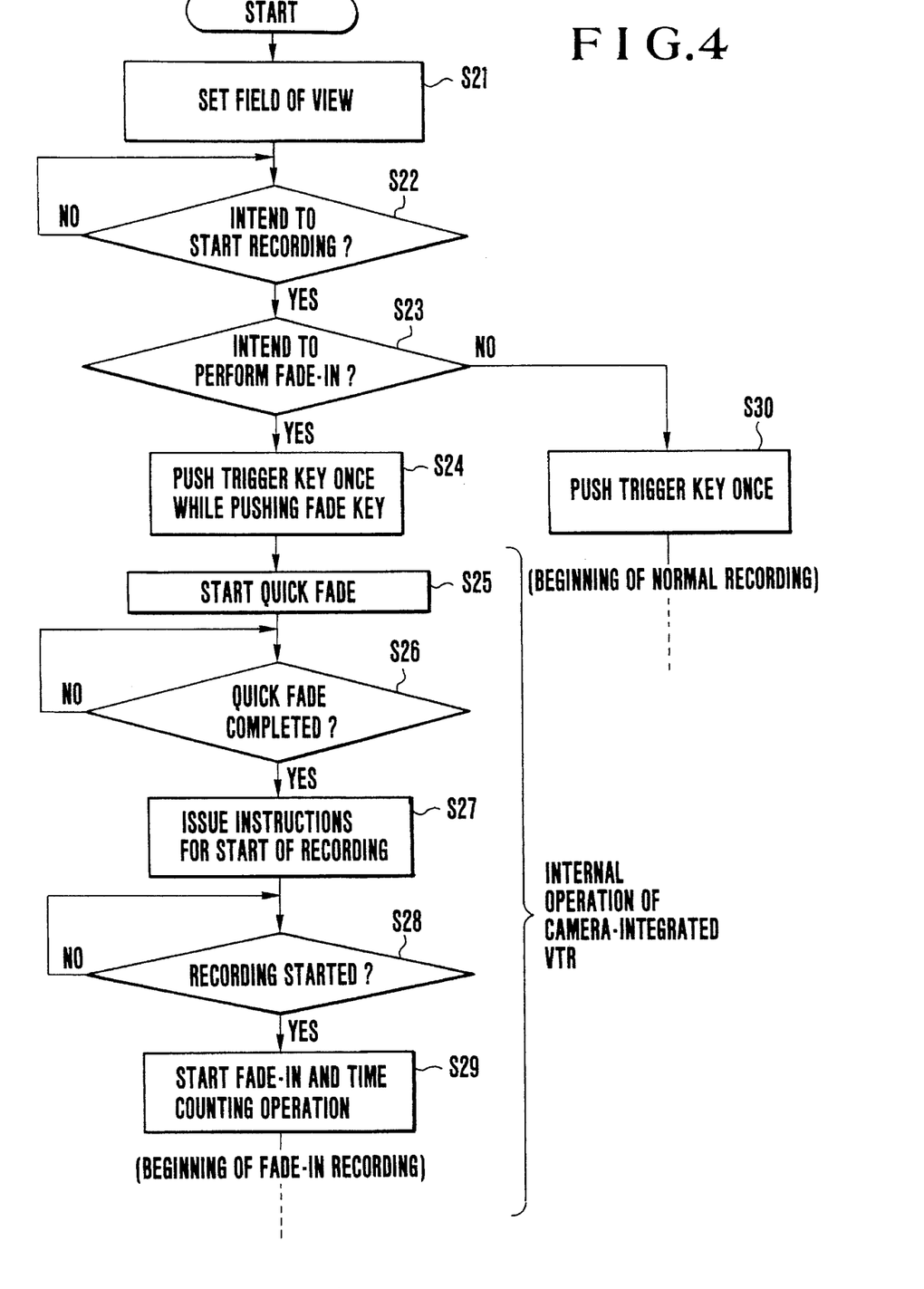
FIG. 4 is a flow chart showing the flow of control over the fade-in recording operation of the embodiment of this invention.

FIG. 4 shows in a flow chart the flow of control over the fade-in recording operation of this embodiment. At a step S21 of FIG. 4, the operator sets a field of view by sighting an image appearing within the electronic viewfinder (EVF) 6. Step S22: Upon arrival of time for commencement of recording, the flow of operation comes to a step S23. Step S23: If fade-in recording is desired, the flow comes to a step S24. Step S24: The trigger key 8 is pushed once (to designate timing of fade-in) while the fade key 9 is being pushed (to designate a fade mode). If, at the step S23, a normal recording is desired instead of the fade-in recording, the flow of operation comes to a step S30. Step S30: Only the trigger key 8 is pushed once.

The operation to be performed by the operator comes to an end through the above-stated steps. The further operation is automatically performed within the camera-integrated type VTR in the following manner: At a step S25: Upon receipt of the instruction from the trigger key 8 and the fade key 9, the system controller 2 instructs the fader control part 4 to perform a quick fade (to instantaneously change the color of the whole picture to a fade color as will be described later). Step S26: A check is made for the end of the quick fade. When the end of the quick fade is confirmed, the flow comes to a step S27. Step S27: The system controller 2 instructs the VTR part 7 to start recording. Step S28: A check is made to find if the VTR 7 has actually taken a recording mode. If so, the flow of operation comes to a step S29. Step S29: The system controller 2 instructs the fader control part 4 to perform fade-in recording. The fader control part 4 then controls and causes the fader circuit 5 to perform a fade-in recording action over a preset period of time. The fade-in recording thus begins.

Figure 5:
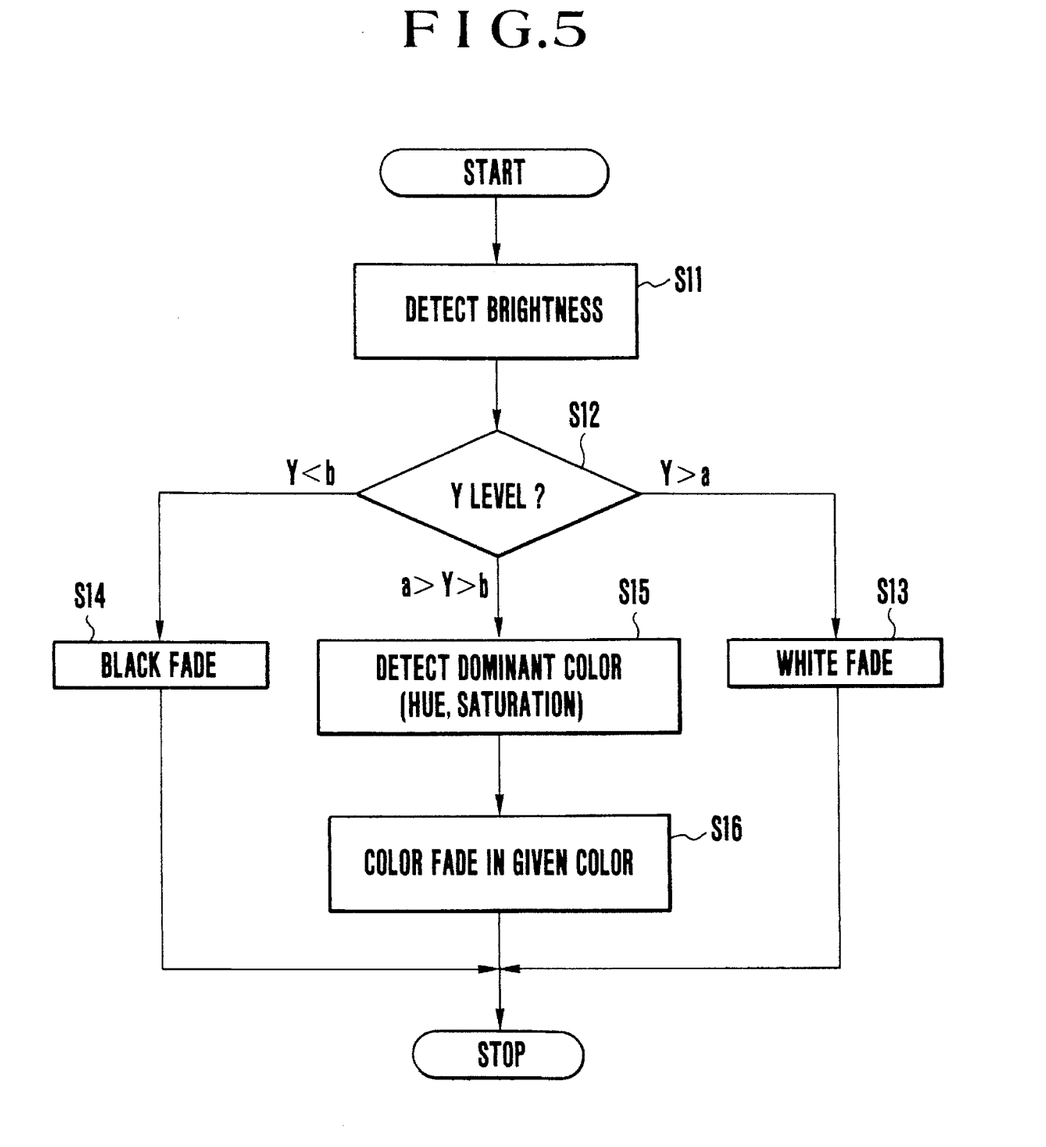
FIG. 5 is a flow chart showing the flow of a fade operation of the embodiment of the invention.

Referring to FIG. 5 which is a flow chart, the details of the fade action performed at the step S25 shown in FIG. 4 are as follows: When the fade action begins, the level of a luminance signal supplied from the camera part 1 is detected at a step S11. Step S12: The luminance or brightness of a photographed object is determined on the basis of the detection output obtained at the step S11. If the object is relatively bright, i.e., if the value of the luminance signal Y is larger than a given value "a", the flow of operation comes to a step S13 to perform white fade. If the object is relatively dark, i.e., if the value of the luminance signal Y is smaller than a given value "b", the flow of operation comes to a step S14 to perform black fade. The term "white fade" means that the color at the beginning of fade is set at white. The term "black fade" means that the color at the beginning of fade is set at black.

Further, in a case where the brightness of the object is between the above-stated given values "a" and "b", the flow of operation comes to a step S15 to receive the color detection output form the camera part 1, and then to a step S16 to perform color fade by setting the fade color at a given color on the basis of the color detection output. More specifically, the hue of the dominant color of the object is detected. The fade color is set at the color of that hue. In addition, the saturation of the dominant color is detected and the density (saturation) of the fade color is set accordingly.

This embodiment is arranged, as described above, to detect the brightness of the object and, after that, white fade, black fade or color fade is set on the basis of the detection output. Therefore, the fade action can be accomplished in a natural manner even in the event of a very dark or bright object for which the color fade cannot be effectively performed.

Further, such an arrangement as to set the fade color of the color fade on the basis of the hue and saturation of the dominant color enables a fade picture to shift to a photographed picture in a natural manner.

Another feature of the embodiment resides in that: When the trigger switch turns on, the timer 2a instantly begins to count recording time. The recording time counted is displayed within the EVF 6 to enable the operator to easily confirm the shooting time. The time count display may be arranged in such a way as to show the time count from the start of recording, the accumulated value of the recording action (time) and, in addition to such values, the remaining amount of the tape (a length of possible shooting time) or the like.

Figure 6:
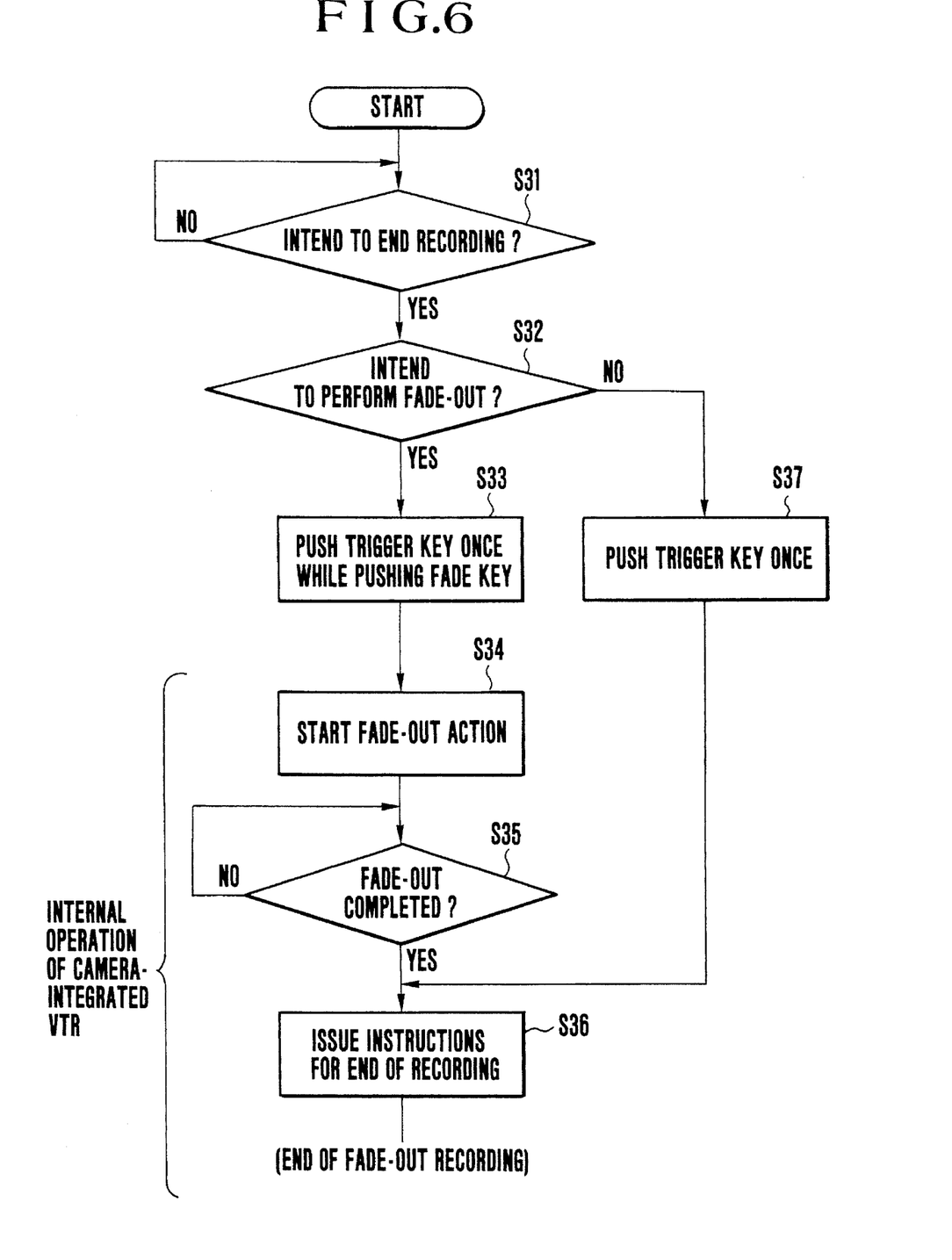
FIG. 6 is a flow chart showing the flow of control over the fade-out recording operation of the embodiment.

FIG. 6 is a flow chart showing the flow of a control operation on fade-out recording. Step S31: When the operator wishes to end recording (to end one cut of shooting), the flow of operation comes to a step S32. Step S32: If fade-out recording is desired, the flow comes to a step S33. Step S33: The trigger key 8 is pushed once (to designate timing of fade-out) while the fade key 9 is being pushed (to designate a fade mode). If it is desired to terminate the recording instantly instead of through the process of fade-out, the flow comes from the step S32 to a step S37. Step S37: Only the trigger key 8 is pushed once. The operation to be performed by the operator comes to an end through these steps. All the subsequent processes of flow of operation are performed automatically within the camera-integrated type VTR in the following manner: In response to the designation made through the trigger key 8 and the fade key 9, the system controller 2 instructs the fader control part 4 to perform fade-out. The fader control part 4 then controls and causes the fader circuit 5 to gradually effect the fade-out over a preset priod of time. Step S35: A check is made through the fader control circuit 4 for the end of the fade-out. Step S36: Upon confirmation of the end of the fade-out, the VTR part 7 is instructed to terminate recording. The fade-out recording thus comes to an end. A fade color for the fade-out is set in the same manner as in the case of FIG. 5.

The embodiment described is arranged to have both the fade key 9 and the trigger key 8 operated for a fade-out. However, this arrangement may be changed to arrange a memory 2b within the system controller 2 to store the information that the shooting has begun with fade-in recording and to automatically perform fade-out with only the trigger key 8 operated at the end of shooting. The operability for fade recording is improved further by this change.

While the fade-in and fade-out are designated by a combination of the trigger key 8 and the fade key 9 in the case of the embodiment described, the invention is not limited to this method. For example, a fade trigger key or the like may be arranged in place of the conventional trigger key 8 to directly designate the timing of fade-in and fade-out. In another possible modification, the above-stated operation is arranged to be performed in an automatic fade mode and, in addition to the automatic fade mode, a manual fade mode is arranged to be selectable to permit manual setting of the above-stated fade color, etc.

In a further possible modification, the fade-in/fade-out timing designation is arranged to be made in accordance with this invention separately from the designation to be made by the conventional trigger key, for example, by varying the manner in which the conventional trigger key 8 is pushed (varying the pushing pressure, for example).

In the case of this embodiment, the invention applied to a camera-integrated type VTR. However, the apparatuses to which this invention is applicable are not limited to this type. The invention is applicable to any apparatus that has components shown in the block diagram of FIG. 3. Further, the apparatus to which the invention is applicable does not have to include a recording part or a reproducing part therein.

Further, the VTR part 7 included in the embodiment described may be replaced with any other means that is capable of recording a video signal, such as an optomagnetic disc recorder or an optical disc recorder.

As described in the foregoing, in accordance with this invention, fade-in and fade-out effects are attainable by the simple, easy operation of pushing the trigger key while pushing the fade key. Therefore, the invention has the following advantages:

(1) The troublesome operation of continuously pushing the fade key is eliminated.

(2) A set field of view remains unimpaired until immediately before the start of a fade-in process.

(3) Selection or no selection of the fade mode can be determined at the time of pushing the trigger key. The embodiment thus enables the operator to effectively cope with a sudden occurrence of requirement for a prompt operation.

What is claimed is:

1. An image sensing apparatus comprising:
   (a) image sensing means for photoelectrically converting sensed image light obtained from an object and outputting an image signal;
   (b) brightness detecting means for detecting the brightness of the object by detecting a level of the image signal;
   (c) fade means for performing a fade action on the image signal output from said image sensing means; and
   (d) control means for controlling said fade means to perform a first fade action for fading with a first color when the brightness is lower than a predetermined threshold value and to perform a second fade action for fading with a second color when the brightness is higher than the predetermined threshold value.

2. An apparatus according to claim 1, wherein said brightness detecting means includes means for detecting brightness on the basis of the luminance level of the image signal from said image sensing means.

3. An apparatus according to claim 1, wherein said first color is black and said second color is white.

4. An image sensing apparatus comprising:
   (a) image sensing means for photoelectrically converting sensed image light obtained from an object;
   (b) color detecting means for detecting a dominant color of the object;
   (c) fade means for performing a fade action on an output of said image sensing means; and
   (d) control means for selecting a fade color to be used by said fading means in accordance with the dominant color detected by said color detecting means.

5. An apparatus according to claim 4, wherein said color detecting means is arranged to detect the dominant color on the basis of a color component included in an output signal of said image sensing means.

6. An apparatus according to claim 5, wherein said color detecting means is arranged to detect the hue of the color component.

7. An apparatus according to claim 5, wherein said color detecting means is arranged to detect the saturation of the color component.

8. An apparatus according to claim 4, wherein said image sensing means includes a CCD.

9. An image sensing apparatus comprising:
   (a) image sensing means for photoelectrically converting sensed image light obtained from an object;
   (b) brightness detecting means for detecting the brightness of the object;
   (c) fade means for performing a fade action on an output of said image sensing means;
   (d) color detecting means for detecting a dominant color of the object; and
   (e) control means for setting the fade action of said fade means at a white fade mode, a black fade mode or a color fade mode in accordance with a detection output of said brightness detecting means and that of said color detecting means.

10. An apparatus according to claim 9, wherein said control means is arranged to cause said fade means to perform black fade when the brightness is lower than a first threshold value, to perform white fade when the brightness is higher than a second threshold value and to perform color fade when the brightness is higher than the first threshold value but lower than the second threshold value in accordance with the dominant color.

11. An apparatus according to claim 9, wherein said color detecting means is arranged to detect the dominant color on the basis of a color component included in an output signal of said image sensing means.

12. An apparatus according to claim 11, wherein said color detecting means is arranged to detect the hue of the color component.

13. An apparatus according to claim 11, wherein said color detecting means is arranged to detect the saturation of the color component.

14. An apparatus according to claim 9, wherein said brightness detecting means includes means for detecting brightness on the basis of the level of an output of said image sensing means.

15. An image sensing apparatus comprising:
   (a) image sensing means for photoelectrically converting sensed image light obtained from an object;
   (b) brightness detecting means for detecting the brightness of the object;
   (c) fade means for performing a fade action on an output of said image sensing means; and
   (d) control means for controlling said fade means to select a direction of the fade action of said fade means in accordance with a detection output of said brightness detecting means,
   wherein said control means is arranged to cause said fade means to perform the fade action from a predetermined bright level to a predetermined dark level in the state that the brightness is higher than a predetermined threshold level and to perform the fade action from the predetermined dark level to the predetermined bright level in the state that the brightness is lower than the predetermined threshold value.

16. An apparatus according to claim 15 wherein said brightness detecting means includes means for detecting brightness on the basis of a luminance level of an output of said image sensing means.

17. An apparatus according to claim 15 wherein said control means is arranged to cause said fade means to perform black fade when the brightness is lower than a predetermined threshold value and to perform white fade when the brightness is higher than the predetermined threshold value.

18. An apparatus according to claim 15 further comprising:
   recording means for recording the image signal output from said image sensing means on a recording medium.

19. An apparatus according to claim 15 wherein said recording means records the signal subjected to the fade by said fade means on said recording medium.

20. An image sensing apparatus comprising:
   (a) image sensing means for photoelectrically converting sensed image light obtained from an object and outputting an image signal;
   (b) brightness detecting means for detecting the brightness of the object by detecting a level of the image signal;
   (c) fade means for performing a fade action on the image signal output from said image sensing means; and
   (d) control means for controlling said fade means to perform black fade when the brightness of the object is lower than a first threshold value, to perform white fade when the brightness is higher than a second threshold value, and perform fading with the optional color when the brightness is higher than the first threshold value but lower than the second threshold value.

21. An apparatus according to claim 20, wherein said brightness detecting means includes means for detecting brightness on the basis of the luminance level of the image signal from said image sensing means.

22. An image signal processing apparatus comprising:
   (a) input means for inputting an image signal;
   (b) brightness detecting means for detecting a brightness of the image signal by detecting a level of the image signal;
   (c) fade means for performing a fade action on the image signal input by said input means; and
   (d) control means for controlling said fade means to perform a first fade action for fading with a first color when the brightness is lower than a predetermined threshold value and to perform a second fade action for fading with a second color when the brightness is higher than the predetermined threshold value.

23. An apparatus according to claim 22, wherein said brightness detecting means includes means for detecting brightness on the basis of the luminance level of the image signal.

24. An apparatus according to claim 22, wherein said first color is black and said second color is white.

25. An image signal processing apparatus comprising:
   (a) input means for inputting an image signal;
   (b) color detecting means for detecting a dominant color component of the image signal;
   (c) fade means for performing a fade action on the image signal; and
   (d) control means for changing a fade color to be used by said fade means in accordance with the dominant color component detected by said color detecting means.

26. An apparatus according to claim 25, wherein said color detecting means is arranged to detect the hue of the color component included in the image signal.

27. An apparatus according to claim 25, wherein said color detecting means is arranged to detect the saturation of the color component included in the image signal.

28. An image signal processing apparatus comprising:
   (a) input means for inputting an image signal;

(b) brightness detecting means for detecting the brightness of the image signal;

(c) fade means for performing a fade action on the image signal;

(d) color detecting means for detecting a dominant color component of the image signal; and (e) control means for setting the fade action of said fade means at a white fade mode, a black fade mode or a color fade mode in accordance with a detection output of said brightness detecting means and that of said color detecting means.

29. An apparatus according to claim 28, wherein said control means is arranged to cause said fade means to perform black fade when the brightness is lower than a first threshold value, to perform white fade when the brightness is higher than a second threshold value and to perform color fade when the brightness is higher than the first threshold value but lower than the second threshold value in accordance with the dominant color component.

30. An apparatus according to claim 28, wherein said color detecting means is arranged to detect the hue of the color component included in the image signal.

31. An apparatus according to claim 28, wherein said color detecting means is arranged to detect the saturation of the color component included in the image signal.

32. An apparatus according to claim 28, wherein said brightness detecting means includes means for detecting brightness on the basis of a luminance level of the image signal.

33. An image signal processing apparatus comprising:

(a) input means for inputting an image signal;

(b) brightness detecting means for detecting the brightness of the image signal;

(c) fade means for performing a fade action on an image signal; and (d) control means for controlling said fade means to select a direction of the fade action of said fade means in accordance with a detection output of said brightness detecting means, wherein said control means is arranged to cause said fade means to perform the fade action from a predetermined bright level to a predetermined dark level in the state that the brightness is higher than a predetermined threshold value and to perform the fade action from the predetermined dark level to the predetermined bright level in the stat that the brightness is lower than the predetermined threshold value.

34. An apparatus according to claim 33, wherein said brightness detecting means includes means for detecting brightness on the basis of a luminance level of the image signal.

35. An apparatus according to claim 33, wherein said control means is arranged to cause said fade means to perform black fade when the brightness is lower than a predetermined threshold value and to perform white fade when the brightness is higher than the predetermined threshold value.

36. An apparatus according to claim 33 further comprising recording means for recording the image signal on a recording medium.

37. An apparatus according to claim 33, wherein said recording means records the signal subjected to the fade by said fade means on said recording medium.

38. An image signal processing apparatus comprising:

(a) input means for inputting an image signal;

(b) brightness detecting means for detecting a brightness of the image signal by detecting a level of the image signal;

(c) fade means for performing a fade action on the image signal input by said input means; and (d) control means for controlling said fade means to perform black fade when the brightness of the object is lower than a first threshold value, to perform white fade when the brightness is higher than a second threshold value, and to perform fading with the optional color when the brightness is higher than the first threshold value but lower than the second threshold value.

39. An apparatus according to claim 38, wherein said brightness detecting means includes means for detecting brightness on the basis of the luminance level of the image signal.

40. A method of processing an image signal comprising:

(a) inputting an image signal;

(b) detecting a dominant color component of the image signal;

(c) performing a fade action on the image signal; and (d) changing a fade color to be used in said fade action in accordance with the detected dominant color component.

41. A method in accordance with claim 40, wherein in said color detecting step the hue of the color component included in the image signal is detected.

42. A method in accordance with claim 40, wherein in said color detecting step the saturation of the color component included in the image signal is detected.

43. A method of processing an image signal comprising:

(a) inputting an image signal;

(b) detecting the brightness of the image signal;

(c) performing a fade action on an image signal; and (d) controlling said fade means action to select a direction of the fade action in accordance with a detected brightness, wherein said controlling step causes the fade action to be performed from a predetermined bright level to a predetermined dark level in the state that the brightness is higher than a predetermined threshold value and to be performed from the predetermined dark level to the predetermined bright level in the state that the brightness is lower than the predetermined threshold value.

44. A method in accordance with claim 43, wherein in said brightness detecting step brightness is detected on the basis of a luminance level of the image signal.

45. A method in accordance with claim 43, wherein in said controlling step the fade action is caused to perform black fade when the brightness is lower than a predetermined threshold value and to perform white fade when the brightness is higher than the predetermined threshold value.

46. A method in accordance with claim 43 further comprising:

recording the image signal on a recording medium.

47. A method in accordance with claim 43 further comprising:

recording the image signal subjected to the fading action on the recording medium.

* * * * *